US009462008B2

(12) United States Patent
Bartos et al.

(10) Patent No.: US 9,462,008 B2
(45) Date of Patent: Oct. 4, 2016

(54) IDENTIFYING THREATS BASED ON HIERARCHICAL CLASSIFICATION

(71) Applicant: Cisco Technology, Inc., San Jose, CA (US)

(72) Inventors: Karel Bartos, Prague (CZ); Michal Sofka, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 21 days.

(21) Appl. No.: 14/519,444

(22) Filed: Oct. 21, 2014

(65) Prior Publication Data

US 2015/0334125 A1 Nov. 19, 2015

Related U.S. Application Data

(60) Provisional application No. 61/994,344, filed on May 16, 2014.

(51) Int. Cl.
*H04L 29/06* (2006.01)
*G06F 21/55* (2013.01)
*G06F 17/30* (2006.01)

(52) U.S. Cl.
CPC ..... *H04L 63/1416* (2013.01); *G06F 17/30861* (2013.01); *G06F 21/552* (2013.01); *H04L 63/1425* (2013.01); *H04L 63/1433* (2013.01); *H04L 2463/142* (2013.01)

(58) Field of Classification Search
USPC ....................................... 726/24, 2
See application file for complete search history.

(56) References Cited

U.S. PATENT DOCUMENTS

| 7,296,288 | B1 * | 11/2007 | Hill ..................... H04L 41/0896 713/194 |
| 8,555,383 | B1 * | 10/2013 | Marshall ................ H04L 63/20 713/151 |
| 2014/0280898 | A1 * | 9/2014 | Voit ........................ H04L 61/00 709/224 |

* cited by examiner

*Primary Examiner* — Jason Lee
(74) *Attorney, Agent, or Firm* — Hickman Palermo Becker Bingham LLP

(57) ABSTRACT

A system and a method are disclosed for identifying network threats based on hierarchical classification. The system receives packet flows from a data network and determines flow features for the received packet flows based on data from the packet flows. The system also classifies each packet flow into a flow class based on flow features of the packet flow. Based on a criterion, the system selects packet flows from the received packet flows and places the selected packet flows into an event set that represents an event on the network. The system determines event set features for the event set based on the flow features of the selected packet flows. The system then classifies the event set into a set class based on the determined event set features. Based on the set class, the computer system may report a threat incident on an internetworking device that originated the selected packet flows.

20 Claims, 6 Drawing Sheets

IDENTIFYING THREATS BASED ON HIERARCHICAL CLASSIFICATION

BENEFIT CLAIM

This application claims the benefit under 35 U.S.C. §119 (e) of provisional application 61/994,344, filed May 16, 2014, the entire contents of which is hereby incorporated by reference for all purposes as if fully set forth herein.

TECHNICAL FIELD

The present disclosure generally relates to improved methods, computer software and computer hardware in the field of security of computer networks. The disclosure relates more specifically to improved computer-based network security devices and computer-implemented techniques that can perform classifying threats in computer networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network security incidents are composed of several events, steps or actions that an attacker may take to compromise a targeted network and extract valuable intellectual property or personal data, or perform malicious reconfiguration operations. These steps may include scanning of potential targets, initial infection, library download, or communication with a command and control server.

Traditionally, signature-based security devices, firewalls, or anti-viruses are deployed to detect such threats. However, signature-based algorithms simply compare a byte sequence that has been detected to stored byte-sequences corresponding to known threats, which may be in a database. Thus, if a new threat has not yet been analyzed and recorded into the database, the signature based algorithm may not identify the new threat. Furthermore, if a threat has the ability to change, the signature-based algorithms may again fail to identify the threat because a current signature of the threat may be different than a stored signature of the same threat that was recorded earlier. Thus, polymorphic malware, zero-day attacks by threats that are novel or previously unseen, or other types of advanced persistent network threats are usually not detected or blocked by signature-based security algorithms.

DESCRIPTION OF EXAMPLE EMBODIMENTS

Figure 1:
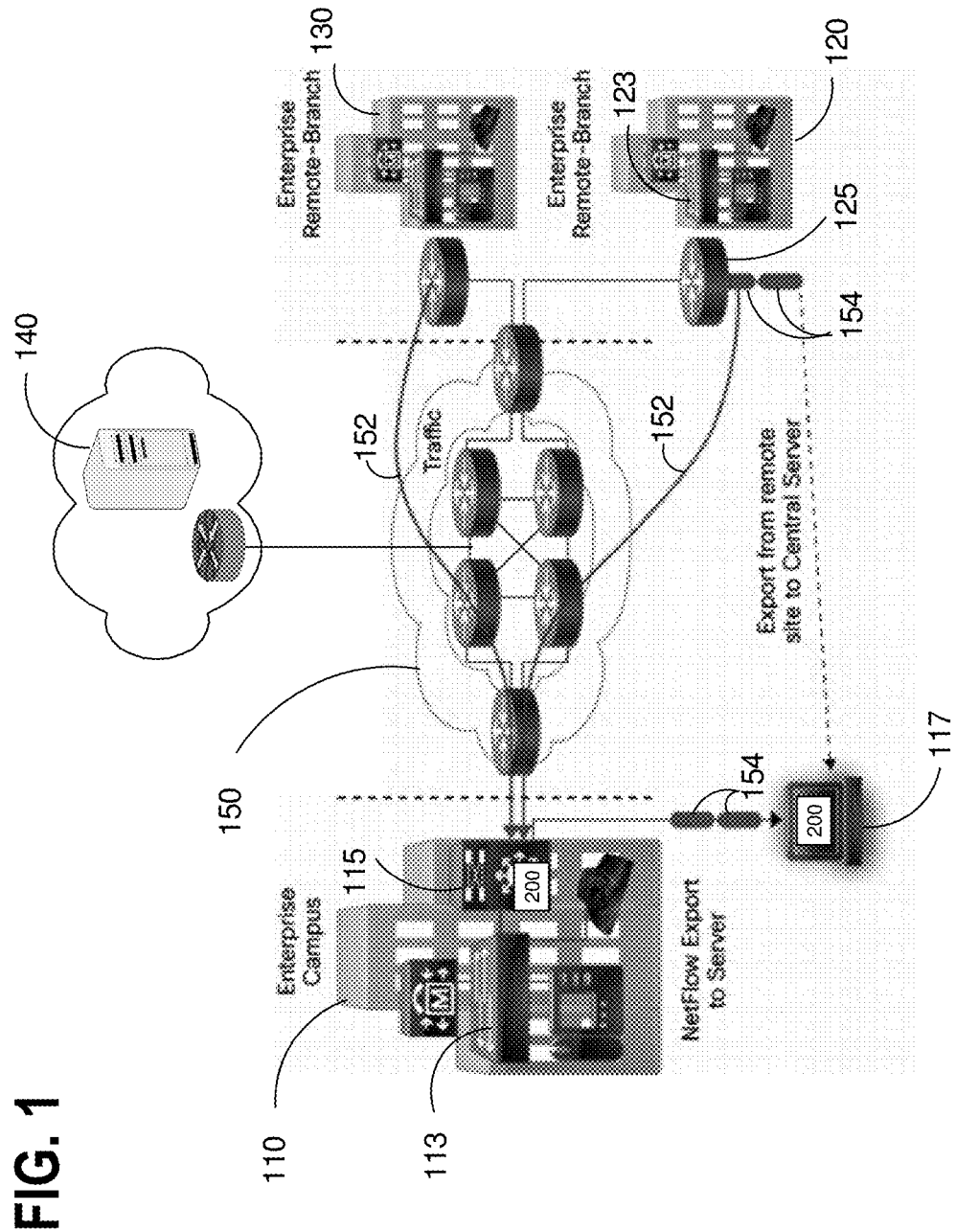
FIG. 1 illustrates an example operating environment upon which an embodiment may be implemented.

Identifying threats based on hierarchical classification is described. In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

Embodiments are described herein according to the following outline:

1.0 General Overview
   2.0 Example Operating Environment
   3.0 Structural Overview
   4.0 Functional Description
      4.1 Flow Level Analysis
      4.2 Complex Features
      4.3 Flow Level Classification
      4.4 Event Description
      4.5 Incident Description
   5.0 Implementation Mechanisms—Hardware Overview
   6.0 Extensions and Alternatives

1.0 GENERAL OVERVIEW

Identifying threats based on hierarchical classification is described. In an embodiment, a computer system receives a plurality of packet flows from a data network. Based on a criterion, the computer system selects packet flows from the plurality of packet flows and places the selected packet flows into a set. The computer system determines, for each packet flow in the set, a flow feature associated with that packet flow based on data from that packet flow, and classifies each packet flow into a flow class based on the flow feature. The computer system further determines set features for the set based on the flow features that are associated with the selected packet flows of the set. The computer system then classifies the set into a set class based on the determined set features. Based on the set class, the computer system may report a threat incident on an internetworking device associated with the selected packet flows. In other embodiments, the disclosure encompasses a method that carries out the foregoing steps using one or more computing devices.

In an embodiment, a hierarchical classification system (HCS) analyzes network packet flows with statistical and machine learning algorithms to identify and report novel security threat incidents from events on a computing device. As referred to herein, "packet flow" describes packet traffic that comprises network packets with the same source and destination internet addresses. In some embodiment, network packets of a packet flow may also have the same source port number, the same destination port number and the same protocol. The events are identified from the packet flows, classified, and combined into incidents based on automatically-recognized relationships. Since the system analyzes various features of network traffic on different levels of granularity, from packet flows to events to incidents, the system may correlate fast classifiers at the lower levels like the packet flow level with complex, more computationally intensive classifiers at the higher levels like incident level to help identify threats more effectively. At every level, the classifiers utilize statistical properties derived from the network traffic at the granularity that is specific to each level as well as information gained at the lower levels. The system then may classify network traffic starting with simple classifiers designed to process millions network connections per minute and ending with modeling the behavior of each potentially infected computing device. The resulting classification data may be used to facilitate more efficient, faster recognition of threats in networks and to initiate remediation efforts.

2.0 EXAMPLE OPERATING ENVIRONMENT

FIG. 1 illustrates an example operating environment upon which an embodiment may be implemented. In FIG. 1, network traffic 152 between enterprise main campus 110 and enterprise remote branches 120, 130 is depicted. The computer system 123 of branch 120 may initiate communication with computer system 113 of main campus 110 through a proxy device 125 that is connected to Internet 150. Packet flows 154 of the network communication from computer system 123 are routed by internetworking devices in Internet 150 to a gateway computer system 115. Once received by gateway computer system 115, the communication is then routed to a destination main campus computer system 113.

In an example of processing a network threat incident, computer system 140, also connected to Internet 150, may be a source of a network attack. The network attack may have been able to penetrate branch computer system 123. Thus, the packet flows from computer system 123 to main campus computer system 113 may contain malicious network attack packets. In order to detect the network threat, HCS logic 200 may be part of gateway system 115, in an embodiment. As the packet flows 154 are received by gateway system 115, the HCS logic 200 may analyze the packet flows 154 using the techniques described herein.

In another embodiment, the HCS logic 200 may be in a separate computer system such as central server computer 117. In this configuration, the HCS logic 200 may import packet flow log data or files ("logs") and analyze them rather than receiving packet flows 154 directly from network. For example, the HCS logic 200 may receive logs from gateway system 115 as well as other systems on the network, such as proxy 125. The logs from proxy 125 may also contain the packet flows of the initial network attack by computer system 140 on computer system 123, since the packet flows containing the attack should have passed through proxy 125. Thus, using techniques described herein, the HCS logic 200 may detect the network threat incident on computer system 123 and also may trace the incident to the originating computer system 140.

3.0 STRUCTURAL OVERVIEW

Figure 2:
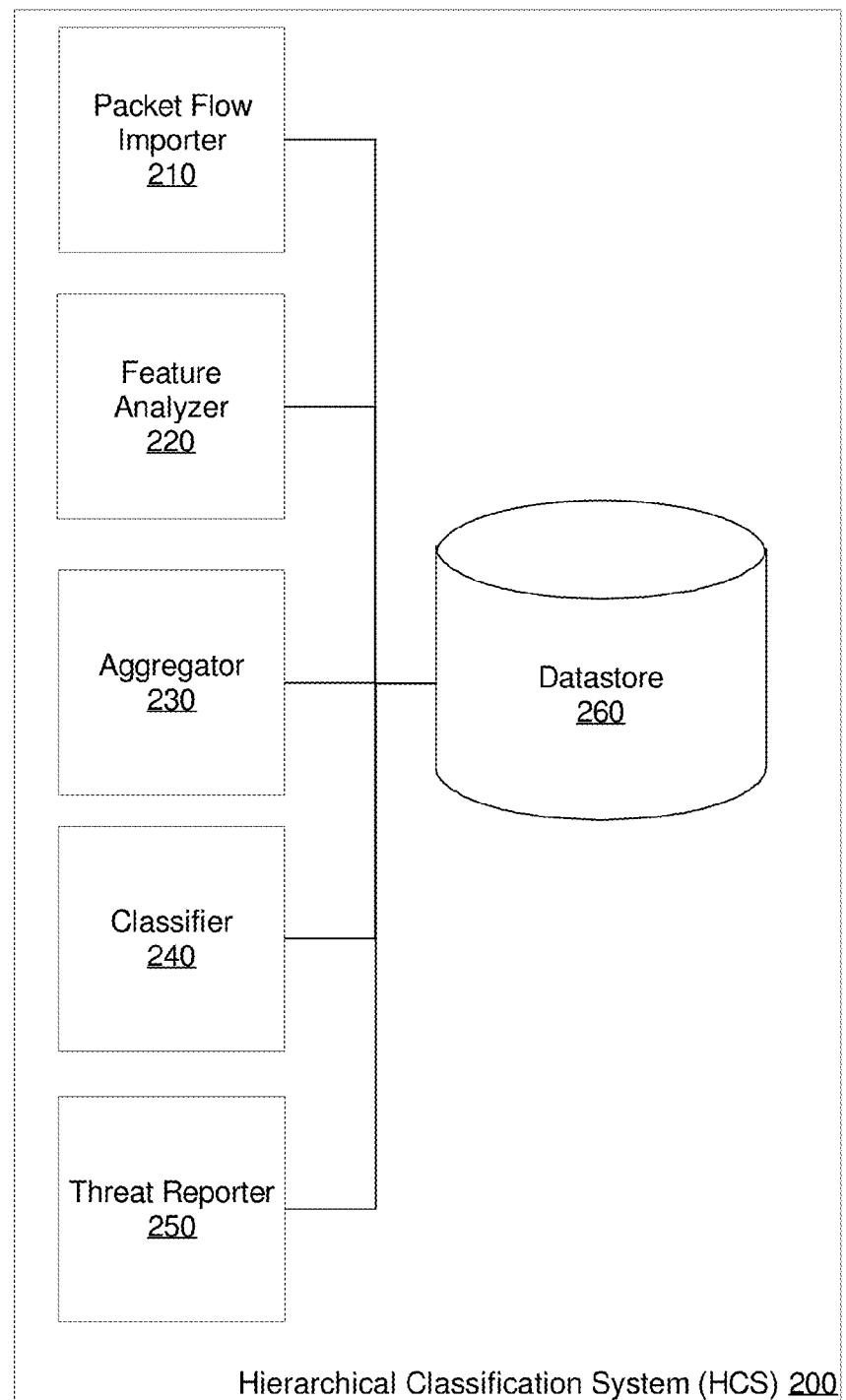
FIG. 2 is a block diagram that illustrates an embodiment of a hierarchical classification system (HCS).

FIG. 2 depicts an embodiment of the HCS logic. In one embodiment, HCS logic 200 may comprise packet flow importer 210, feature analyzer 220, aggregator 230, classifier 240, threat reporter 250 and datastore 260. For purposes of brevity, the terms packet flow importer 210, feature analyzer 220, aggregator 230, classifier 240, threat reporter 250 and datastore 260 are used and each such unit may be implemented, in various embodiments, using one or more computer programs or other software elements, one or more units of digital logic, a special-purpose computer, or other computing elements.

In an embodiment, the packet flow importer 210 may be configured to be coupled to a network interface to receive packet flows from network. Once received, the packet flows may be analyzed on-line or stored into the datastore 260 for future analysis. In an alternative embodiment, packet flow importer 210 may import log data such as log files that contain packet flow data. Such log files may be from various internetworking devices that the HCS logic 200 can access, such as proxy 125 or gateway system 115. Packet flow importer 210 may analyze the imported log files to determine flow features before or after storing the packet flow data into datastore 260. "Packet flow data," as used herein, is data that describes packet flow information or derives from packet flow information and typically comprises a five-tuple or other set of values that are common to all packets that are related in a flow, such as source address, destination address, source port, destination port, and protocol value.

In an embodiment, datastore 260 may be a data storage device and/or a database that has a particular database schema. Thus, packet flow importer 210 and other components of HCS logic 200, using datastore 260, may convert packet flow data to the particular database schema to store the data in the database of datastore 260. In an alternative embodiment, datastore 260 may comprise a file system with one or more structured data files that may have various formats or schemas. For example, datastore 260 may store packet flow data in log files similar to or exactly matching log files received by packet flow importer 210, while other data may be stored in XML files conforming to a particular schema. The exact type of datastore, schema, or combination of schemas are not critical.

In an embodiment, feature analyzer 220 is configured to determine features of packet flows or any aggregation of packet flows. Feature analyzer 220 may receive packet flow data from packet flow importer 210 or may select packet flow data from datastore 260 to perform analysis of the received packet flows. Feature analyzer 220 may first perform a basic analysis to extract native flow features. "Native flow feature" refers herein to a feature of a packet flow that is intrinsic to the packet flow and generally may be extracted from packet flow fields. A list of example native flow features is in Table 1 below. Using native flow features and other packet flow data, feature analyzer 220 may perform calculations to determine complex features. A "complex feature" refers herein to a feature of packet flow that may not be readily available from native flow fields of a packet flow. A complex feature may be calculated based on statistical features of one or more native flow features. Feature analyzer 220 may also determine other types of features such as event and incident features as described in more detail below. Feature analyzer 220 may retrieve the packet flow data necessary for calculations from datastore 260 or receive the data directly from other components of HCS logic 200. Once calculated, feature analyzer 220 may store features into datastore 260.

In an embodiment, aggregator 230 is configured to hierarchically aggregate packet flows into multiple hierarchical levels of sets and groups. Aggregator 230 may use various criteria to aggregate packet flows. Such criteria may include time periods, origin devices, events on the origin devices or any combination of thereof. Aggregator 230 may also use various features of packet flow data in the aggregation. Aggregator 230 may retrieve packet flow data for aggregations from datastore 260 or receive the data directly from other components of HCS logic 200. Once aggregated, aggregator 230 may store the new aggregation into datastore 260.

In an embodiment, classifier 240 is configured to classify packet flows, sets and groups of packet flows into categories and classifications. The classifications may include threat levels such as malicious, fault, possible policy violation, warning, legitimate and OK. The categories may include the type or behavior of network traffic that a packet flow or an aggregation of packet flows represents. Examples of categories may include multimedia streaming, rich site summary (RSS) feed, generated domain traffic and many others.

Classifier 240 may retrieve packet flow data for classification from datastore 260 or receive the data directly from other components of HCS logic 200. Once classified, classifier 240 may store the classifications into datastore 260.

In an embodiment, threat reporter 250 is configured to report classifications of packet flow data to computer display devices, which may be used by users of HCS logic 200, in an embodiment. Threat reporter 250 may report the classifications for any level of aggregation from a single packet flow to a network incident. The reports may assist in the analysis of classifications and understanding of classification of previously undetected malware.

4.0 FUNCTIONAL DESCRIPTION

Figure 3:
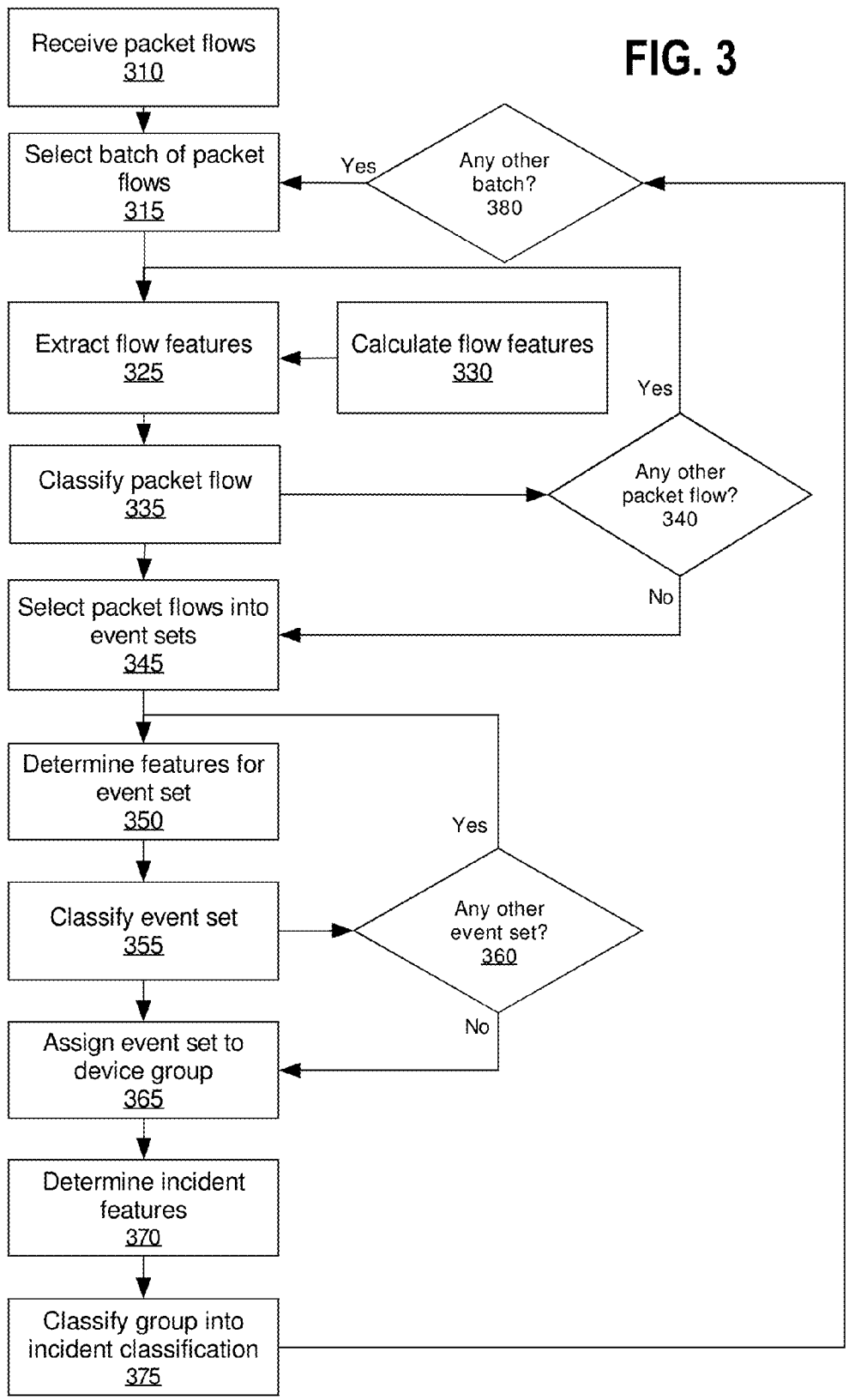
FIG. 3 is a flow diagram that depicts a process of hierarchically classifying packet flows into network threats, in an embodiment.

FIG. 3 is a flow diagram that depicts a process of hierarchically classifying packet flows into network threats, in an embodiment. At block 310, packet flows are received by HCS logic, such as HCS logic (FIG. 1, FIG. 2). The HCS logic may then select all or part of the received packet flows for analysis and classification at block 315. In a related embodiment, the HCS logic may periodically select a batch of received packet flows for analysis, where each batch contains packet flows corresponding to the selection period. Any timestamp associated with a packet flow may be used to determine whether the packet flow corresponds to the selection period. In one embodiment, such timestamp may be origination timestamp of the packet flow, and in another embodiment, it may be the timestamp of the receipt of the packet flow by the HCS logic or the timestamp the packet flow is recorded in a log file that the HCS logic has imported.

Figure 4:
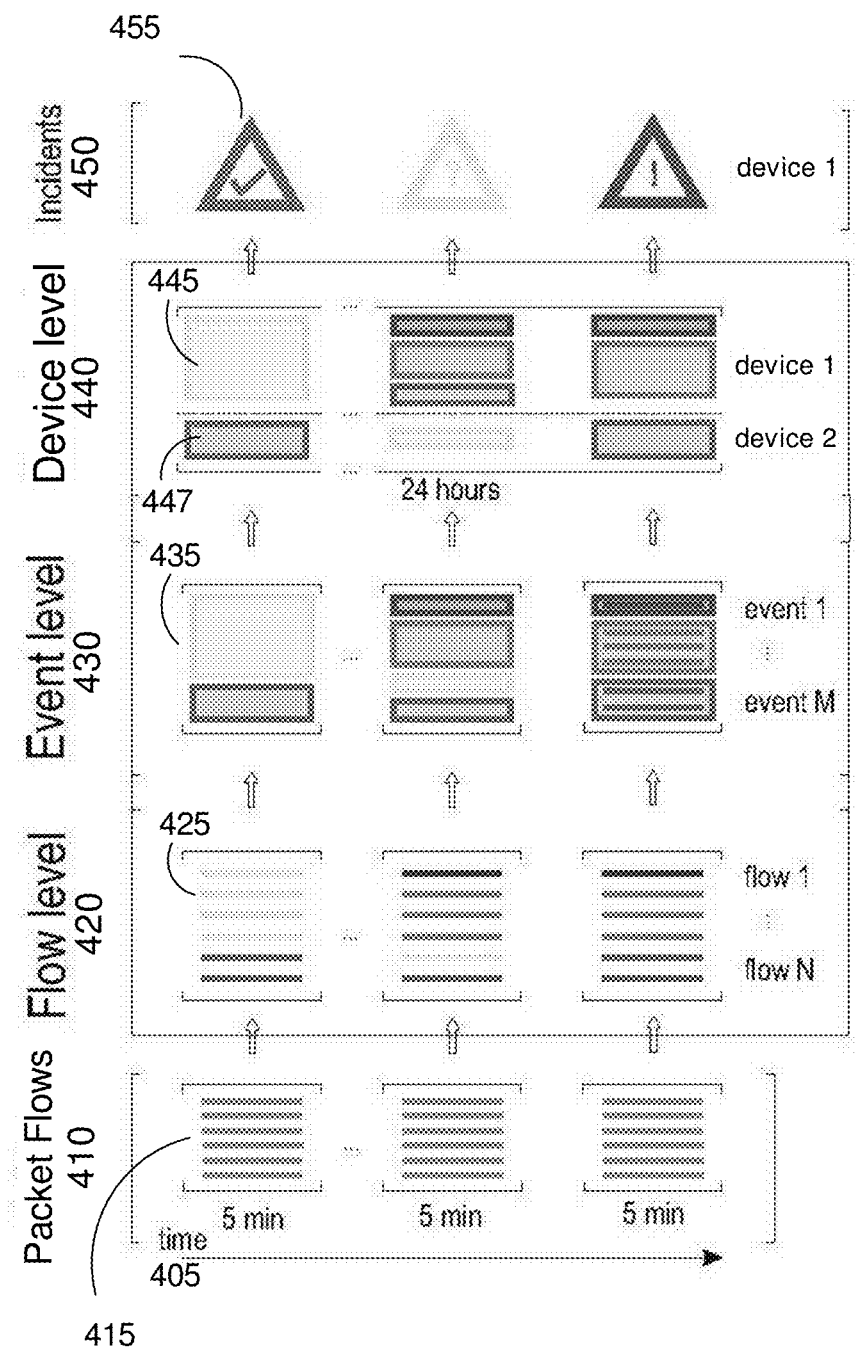
FIG. 4 depicts an example of packet flow classification on different levels of hierarchy, in an embodiment.

FIG. 4 depicts an example of packet flow classification on different levels of flow hierarchy, in an embodiment. In FIG. 4, the HCS logic receives packet flows 410 either from a log file or network interface. The HCS logic then selects, for analysis, a particular batch 415 that corresponds to all the packet flows with timestamps within a particular time period, such as five minutes. The particular time period may vary in different embodiments or according to configuration data in the same embodiment. The HCS logic continues to select for analysis the next batch of packet flows until all packet flows in the log files have been analyzed. Alternatively, the HCS logic may continuously select batches of packet flows as new packet flows are received by the system, as depicted by batches on time axis 405 in FIG. 4.

In an embodiment, the packet flow importer 210 of the HCS logic 200 may perform block 310 and store the received packet flows into datastore 260.

4.1 Flow Level Analysis

The HCS logic may be configured to analyze and classify individual packet flows on packet flow level, in an embodiment. At block 325 of FIG. 3, the HCS logic may extract native flow features of packet flows that provide the HCS logic with information to classify a packet flow. As described in Table 1, the process may extract intrinsic features such as flow duration or number of bytes transferred. In addition to intrinsic features, the native flow features may include protocol specific features. For example, HTTP header information may be extracted from HTTP protocol packet flows. Table 1 provides a sample of HTTP specific features, but other protocols and protocol features may be extracted for the analysis.

In another embodiment, the feature analyzer 220 of the HCS logic 200 may perform block 325 to extract native flow features of packet flows. Feature analyzer 220 may then store the extracted features in datastore 260 in association with the corresponding packet flows.

TABLE 1

Sample Native Flow Features

| Feature Name | Description |
| --- | --- |
| URL | Origin or destination URL of the packet flow such as Host field in HTTP protocol. |
| Flow duration | Time duration between the first packet received in a flow till the last packed received in the flow |
| Client-server traffic size | Number of bytes transferred from client to server |
| Server-client traffic | Number of bytes transferred from server to client |
| User agent | Browser or application description related to the packet flow |
| Referrer | URL of the redirection that generated the packet flow. |
| MIME-type | Content type of packet flow. |
| Status | HTTP response status codes |

4.2 Complex Features

In an embodiment, at block 330, complex features of a packet flow may be calculated based on the native features of the packet flow. For example, the HCS logic 200 may apply a set of functions to native flow features to calculate complex features. In a related embodiment in which the extracted packet flows are using a protocol that utilizes an URL, such as HTTP protocol, statistical features may be calculated for each of the packet flow or a group/set of packet flows that contain the same URL information. The complex features are calculated by applying a set of functions on the URL string or any portion of the URL string.

Figure 5:
FIG. 5 depicts an URL string partition, in an embodiment.

FIG. 5 depicts a URL string partition, in an embodiment. A URL string may be decomposed into a protocol, domain, path, file name, file fragment and query strings. A protocol string, such as protocol 510, may have values that denote various application protocols of packet flows, such as "http" for the HTTP protocol or "ftp" for the FTP protocol. Second-level domain string 520 in combination with top-level domain (TLD) 530 strings denote the domain name of a host computer that the URL string references. The actual network address of the host computer may be accessed by requesting the network address corresponding to second-level domain 520 and TLD 530 from a computer hosting a name resolution server, such as a DNS server. Path 540 and file name 550 strings denote the path to the file name on the host computer system to be invoked using the URL string. Query string 560 denotes the meta-data passed in to the file and fragment 570 denotes an index to a particular portion of the file.

In an embodiment, a URL string or a partition of the URL string as described above or any combination of partitions of the URL string may be used as an input string to calculate the values of one or more of the following complex features.

Length—describes the number of characters in the string, in an embodiment.

Consonant to vowel change ratio—describes the frequency of changes between consonants and vowels, in an embodiment. The equation below describes the ratio $r_v$, where $l(c_i)$ describes the length feature of the input string $c_i$.

$$r_v(c_i) = \frac{\text{number of changes from consonant to vowel}}{l(c_i)}$$

ASCII metric—describes whether the input string contains any characters that are in the UTF-8 character set but not in the ASCII character set, in an embodiment. The ASCII metric feature may be a Boolean value indicating whether any character outside of ASCII character set exists in the input string. The metric may have a value of FALSE when any character from the input string is outside the ASCII range of characters and may have a value of TRUE otherwise.

Maximum character occurrence ratio—describes the maximum number of the recurrence of a character in the input string as compared to the length of the string, in an embodiment. This ratio feature may be calculated by measuring a maximum number of recurrences of any character in the input string and by dividing the maximum number by the length of the input string.

Maximum character type occurrence ratio—describes the maximum number of the recurrence of a character type in the input string as compared to the length of the string, in an embodiment. An example of character type is a letter character, a capital letter character, a number character or a special character. In a related embodiment, this ratio feature may be calculated by measuring the maximum number of recurrences of any of the character types and dividing the maximum number by the length of the input string.

URL based form addressability—describes whether the input string contains URL addressable forms, in an embodiment. Special characters may be used as separators in URL addressable forms and views. Thus the repetitive occurrence of special characters may indicate that a page associated with the URL contains forms and views. In a related embodiment, the feature may be calculated by counting the number of occurrences of special characters such as '=' and '&'.

Popular trigram probability—describes whether trigrams within the input string are similar to those in well-known domain names, in an embodiment. An existing repository of well-known domains, such as the ALEXA service, may be used. In a related embodiment, the most popular trigrams in the domains of a domain repository may be ranked. Then, each of component trigrams from the input string may be compared to the ranked list of the most popular trigrams of the repository. If a component trigram matches, then a probability value is assigned to the component trigram based on the rank of the matched popular trigram. In this approach, a higher rank of the matched trigram results in assigning a greater probability value to the component trigram. To calculate the feature, an average may be taken of all probabilities assigned to the component trigrams of the input string. For example, a ranking of 1 to 1,000 is selected for trigrams in the repository. To rank all the repository trigrams, each trigrams probability may be calculated using the following equation:

$$p_t(t(A)) = \frac{\text{number of } t(A) \text{ occurrences in } Alexa}{\text{number of all trigrams in } Alexa},$$

where t(A) represents a trigram of domains in the repository.

Then a rank may be assigned to each domain trigram describing the trigram frequency. The rank may be described by:

$$\forall i,j \leq |A| : p_t(t^{(i)}(A)) \geq p_t(t^{(j)}(A)) \Leftrightarrow i \leq j,$$

where $p_t(t^{(i)}(A))$ denotes i-th most-frequent trigram from the repository, $|A|$ is a number of trigrams in the repository, and $i \in \{1, \ldots, 1000\}$.

The ranking probability of each component trigram in the input string, t(d), may then be calculated as:

$$\hat{p}_t(t(d)) = \begin{cases} 1 - (i-1) \cdot 10^{-4} & \exists i \leq 1000 : t(d) = t^{(i)}(A) \\ 0 & \text{otherwise} \end{cases},$$

where $\hat{p}_t(t(d))$ is a ranking probability of t(d) component trigram in the input string. The feature may be calculated by averaging of all ranking probabilities $\hat{p}_t(t(d))$. In a related embodiment, highly ranked domain trigrams for long domains may be discarded to ensure that long domains, which are more likely to have popular trigrams, do not skew the probabilities.

Maximum adjacent trigram probability—describes the probability of locating adjacent popular trigram in the input string, in an embodiment. In a related embodiment, the feature may be calculated by calculating the probabilities of two adjacent trigrams based on the probabilities of component trigrams of the input string, as follows:

$$p_t(t_j(d), t_{j+1}(d)) = \frac{\hat{p}_t(t_j(d)) + \hat{p}_t(t_{j+1}(d))}{2},$$

Then the maximum of all the calculated probability values is computed to determine the feature:

$$m(d) = \max_j (p_t(t_j(d), t_{j+1}(d))).$$

Suspicious trigrams metric—describes the number of unpopular trigrams found in the input string, in an embodiment. In a related embodiment, the feature may be calculated by counting the number of component trigrams of the input string that have a value of zero for their respective ranking probability as calculated above:

$$n(d) = \text{number of trigrams with } \hat{p}_t(t(d)) = 0.$$

In a related embodiment, the feature analyzer 220 of HCS logic 200 may perform block 330 to calculate complex features of packet flows. Feature analyzer 220 may then store the complex features in datastore 260 in association with the corresponding packet flows.

4.3 Flow Level Classification

At block 335 of FIG. 3, packet flows of a batch are classified. In an embodiment, packet flows may be classified into malicious (M), possible policy violation (PPV) and legitimate (L) packet flows. The classification is based on the calculated complex features and extracted native features that are compared to malicious network traffic properties.

For example, a malicious network traffic that originates from non-browser may not have the "user agent" field set in the HTTP headers of packets of the flow. In response, the HCS logic 200 may analyze the "user agent" native flow feature of a packet flow and, if the field is missing or set to a value indicating a non-recognizable browser, then the HCS logic 200 may classify the packet flow as "malicious non-browser traffic" category and set the classification to "M." Similarly, the HCS logic 200 may examine the "MIME-type" native feature of a packet flow, and if the field is set to "application/x-bittorrent," then the packet flow may be categorized as "torrent tracker" and classified as "PPV." On the other hand, if the "MIME-type" native feature has value of "video/x-msvideo," then the HCS logic 200 may classify the packet flow in a "multimedia (audio/video streaming)" category with "L" as classification. In the examples above, for purposes of illustrating a clear example, only a single feature is used to classify a packet flow, however in practice multiple or all features of a packet flow are used to classify a packet flow.

In an embodiment, complex features may be used to determine whether a URL string representing the whole URL or a partition of the URL from a packet flow is statistically similar to a URL string from a malicious threat. For example, malicious network traffic may contain URL strings that are computer-generated. Identifying the existence of such a computer generated string in a URL of a packet flow may likely classify the packet flow as malicious (M). A URL string may be identified as computer generated, if the string has a statistically random distribution of characters. In a related embodiment, random distribution of characters in a URL string may be identified by analyzing maximum character/character type occurrence, consonant to vowel change ratio or any combination thereof. For example, if the consonant to vowel change ratio for a URL string is small, then the URL string may be computer generated, and thus, the packet flow with the URL string may be malicious.

In another embodiment, the URL string may be identified as originating from a malicious network threat if the URL string is determined to be statistically different from well-known URL strings. For example, most well-known URL strings are easy to pronounce and thus contain frequently used trigrams. In a related embodiment, complex features, such as popular trigram probability, maximum adjacent trigram probability, the suspicious trigrams metric or a combination thereof may represent the degree of statistical similarity of the URL string with a malicious URL string. For example, if the suspicious trigrams metric feature has a large value, then the packet flow containing the URL string may be classified as malicious.

In another embodiment, the HCS logic 200 may be configured to self-train based on known malicious and legitimate traffic on ranges of feature values that correspond respectively to malicious and legitimate packet flow feature values. In an embodiment, once the HCS logic 200 extracts or calculates features of a packet flow, the HCS logic may classify the packet flow based on a comparison of its features with the known ranges. Table 2 lists example classifications and categories for a packet flow based on its features, for an embodiment. In a related embodiment, a packet flow may be categorized into more than one category from Table 2.

TABLE 2

Classifications and categories for a packet flow

| Classifier | Category |
|---|---|
| M | Data transfer through URL to computer-generated domain |
| M | Downloading file with multiple extensions |
| M | Data transfer through URL to raw IP address |
| M | Communication with generated domain |
| M | Data transfer through URL |
| M | Download of malicious executable file |
| M | Malicious non-browser traffic |
| M | Malicious repetitive requests |
| M | WPAD (Web Proxy Auto-discovery Protocol) misuse |
| PPV | Torrent user |
| PPV | Remote desktop |
| PPV | Torrent tracker |
| L | Proxy connect |
| L | Connection check |
| L | Streaming/downloading data |
| L | Upload data through body |
| L | Skype user |
| L | Flash |
| L | Multimedia (audio/video streaming) |
| L | Software update |
| L | RSS feed |
| L | File download |

Block 340 of FIG. 3 indicates repeating blocks 325 through 335 associated with determining features of a packet flow and classifying the packet flow, for all packet flows in a batch. FIG. 4 depicts an example of the result of classifying packet flows, in an embodiment. A batch 415 of packet flows has been classified at flow level 420. The packet flows 425 represents a classified batch of packet flows of batch 415. The classification of each packet flow within packet flows 425 is represented by different shadings.

In a related embodiment, classifier 240 may perform block 340 and may then store the flow classifications in association with the corresponding packet flows in datastore 260.

4.4 Event Description

At block 345 of FIG. 3, packet flows of a batch are selected into an event set, in an embodiment. An event set may consist of packet flows that has been transmitted in response to an event on a computing device. Such event may represent one click of a user in a browser, or a single action of a malware item. Packet flows may be selected into an event set based on a criterion. According to one embodiment, the criterion for the selection of packet flows may be the proximity of their respective time stamps, and packet flows with same or similar timestamp may be grouped into a particular event set. In an alternative embodiment, packet flows may be grouped into a particular event set based on native features of the packet flows such as referrer. Other techniques for selecting packet flows into event sets may be implemented as described in U.S. patent application Ser. No. 14/519,160 filed on Oct. 21, 2014.

At block 350, HCS determines event set features based on flow features of packet flows of an event set. The event set features may represent consistency, variability, and ranges of the flow features in the event set. The event set feature values may be determined by applying various functions to the flow feature values of the packet flows of the event set. In an embodiment, aggregation functions such as minimum, maximum, average, standard deviation, may be applied.

In an embodiment, values for a particular complex flow feature may be aggregated to determine an event set feature. For a particular complex feature, described in section 4.2, flow feature values of packet flows of an event set may be selected. Then, an aggregation function may be applied to the selected values to produce an event set feature. For example, a mean suspicious trigrams metric of an event set may be determined by averaging all the suspicious trigrams metric values of packet flows of the event set.

Similarly, a combination of aggregation functions may be used to derive an event set feature. An event set feature may be calculated by removing outlier flow feature values based on the standard deviation of the flow feature values. If a flow feature value is a number of standard deviations away, then the flow feature value may be designated as an outlier and not be used in calculation of an aggregation function to determine an event set feature. Continuing with the above example using the mean suspicious trigrams metric, a standard deviation based on all the suspicious trigrams metric flow feature values is first calculated; the flow feature values that are outside of three (3) standard deviations from the mean metric value are disregarded. An adjusted mean suspicious trigrams metric event set feature is then calculated based on the remaining flow feature values for the suspicious trigrams metric. However, the exact combination of aggregation functions is not critical.

In another embodiment, an event aggregation flow feature may be determined by selecting a common native flow feature. The value of the event aggregation flow feature may be determined based on identifying common native flow feature values of packet flows of an event set. The common feature values may be determined based on the percentage of flow features that have a same or similar value. For example, if a MIME-type native feature has value of "video/x-ms-video" for all packet flows in an event set, then an event set feature MIME-type is assigned to the value "video/x-ms-video".

At block 355 of FIG. 3, an event set is classified into classes. Such classes may match packet flow classifications such as malicious (M), possible policy violation (PPV) and legitimate (L) events or may be more or less granular. In an embodiment, an event set may be classified based on event set feature by comparing event set features to known event properties. For example, an event set may be classified as malicious, if a known malware has same or similar feature values. The malware is determined to have the same or similar features when statistical analysis of known malware features substantially matches the event set features. Similarly, event set features may be compared to statistical properties of the legitimate network events to determine whether the event set represents a legitimate event.

In a related embodiment, an event set may be classified without comparison to known event properties. An event set feature may itself represent an anomaly in a network traffic because the event set feature may describe a discrepancy in flow feature values of packet flows of the event set. For example, continuing with the above example using the mean suspicious trigrams metric, if the standard deviation of suspicious trigrams metric values divided over the mean is below 1, then flow feature values for the metric have low variance. Thus, the mean suspicious trigrams feature of the event set may be precisely representative of all packet flows and may classify the event as a legitimate or malicious by itself.

In another embodiment, an event set may be classified based on flow classifications. An event set may be classified based on the number/percent of occurrences of different classifications within the classifications of packet flows that are selected into the event set. For example, if majority of packet flows selected in an event set have been classified as malicious, then the event set is classified as malicious. In another example, an event set may be classified based on the worst case scenario and thus, if any packet flows is classified as malicious in an event set, then the event set is classified as malicious.

In another embodiment, flow features of packet flows may be the basis for classifying an event set to which the packet flow belongs. When even set features do not yield a conclusive classification, an event set may be classified based on packet flow features. For example, if the majority of packet flows have various native flow features that are classified as malicious, then regardless of values for the respective event set features, the event set is classified as malicious.

At block 360 of FIG. 3, blocks 350 and 355 for determining features of an event set and classifying the event set are repeated for all event sets, in an embodiment. FIG. 4 depicts an example of the result for selecting packet flows into event sets and classifying the event sets. Event level 430 depicts the selection of packet flows 425 into event sets 435 and the classification of event sets 435. Each event set in event sets 435 is depicted by a rectangle, where the shading of rectangle corresponds to the classification of the corresponding event set. In an embodiment, with time 405, other batches of packet flows are received and classified, new events sets are aggregated on event level 430 in accordance with blocks 350 and 355 of FIG. 3, in an embodiment.

In alternative embodiments, numerous event levels may exist based on temporal aggregation of event sets and aggregation of the underlying packet flows of the event sets. For example, event sets may be aggregated into an hourly event set that comprises of all event sets that have packet flows with timestamps that are within a particular hour-long duration. Such higher level event sets may have features and classifications determined using the same techniques described herein.

In a related embodiment, aggregator 230 may perform block 345 to select packet flows into event sets. Feature analyzer 220 may perform block 350 to determine event set features and then, may store the event set features in datastore 260 in association with the corresponding event sets. Classifier 240 may perform block 355 to classify event sets into classifications and then, may store the event set classification into datastore 260 in associations with the corresponding event sets.

4.5 Incident Description

At block 365 of FIG. 3, an event set is assigned to a device group based on an originating computing device and timestamp, in an embodiment. Each timestamp may be determined by the timestamps associated with the packet flows comprising the event set. The event sets from the same originating device or multiple originating devices with the same user may be selected based on the timestamps of the event steps. A device group for a particular time period may contain all event sets from the originating device(s) that are within the particular time period. Since each of the event sets represents an event on the originating device(s), a device group of event sets represents an incident on the originating device(s) during the particular time period. For example, an incident for past 24 hours may be represented by a device group that comprises event sets from the originating device(s) that have timestamps within past 24 hours from the current time. Similarly, other grouping of event sets into a device group may be performed in other embodiments to represent other incidents, however, the exact time period duration used to assign event sets to a device group is not critical to the techniques described herein.

At block 370, incident features for a device group are determined, in an embodiment. Incident features of a device group may be determined similar to techniques described for event sets in section 4.4. Incident features of a device group may be calculated by statistically aggregating event set features of event sets of the group or flow features of packet flows of the event sets of the group. Thus, the incident features may similarly represent consistency, variability, and ranges of the event set features and the flow features corresponding to the events on a computing device during a particular time period.

At block 375, a device group is classified into a particular incident classification, in an embodiment. The incident classifications may match event and packet flow classifications such as malicious (M), possible policy violation (PPV) and legitimate (L). In a related embodiment, a device group may have different incident classification which may be higher or lower granularity than the event set or flow classifications. For example, a device group may be classified into OK, warning, or fault incident classifications.

In an embodiment, a device group may be classified using techniques similar to an event set classification, such as those described in sections 4.3 and 4.4. The device group may be classified based on the determined device group features. In a related embodiment, a device group may be classified based on one or more event set features, event set classifications, flow features and packet flow classifications or combination thereof.

In an embodiment, at block 380, blocks 315 through 375 may be repeated for new batches. Thus, new incidents may be generated based on new events received in the new batches following the same process of FIG. 3. For example, FIG. 4 depicts receiving a new batch every 5 minutes and incidents 450 may be classified every 5 minutes based on the new packet flows received. Since incident classifications may be performed per originating device, event sets from 435 that originated at device 1 are selected into device group 445, and event sets that originated at device 2 are selected into device group 447 on device level 440. In an alternative embodiment, if device 1 and device 2 are determined to have the same user, the event sets from 435 may be selected into a single device group.

Incidents 450 comprise incidents, such as incident 455, which have a time period duration of 24 hours and are created every 5 minutes. Incidents 450 are classified based on corresponding device groups and the device groups' event sets and packet flows. For example, incident 455 is classified based on device group 445 and based on event sets from event set 435 and packet flows from packet flows 425 from batch 415. As new batches of packet flows are received, new incidents are created that, depending on time period, may or may not include previous incidents event sets and packet flows. Thus, the new incidents may have different classifications as depicted by incidents 450.

In a related embodiment, aggregator 230 may perform block 365 to assign event sets to device groups and may store them in datastore 260. Feature analyzer 220 may perform block 370 to determine incident features and then, may store the incident features in datastore 260 in association with the corresponding device groups or may directly pass the incident features to classifier 240. Classifier 240 may perform block 375 to classify device groups into incident classes. Classifier 240 may then store the incident classifications into datastore 260 in associations with the corresponding device groups.

5.0 IMPLEMENTATION MECHANISMS

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
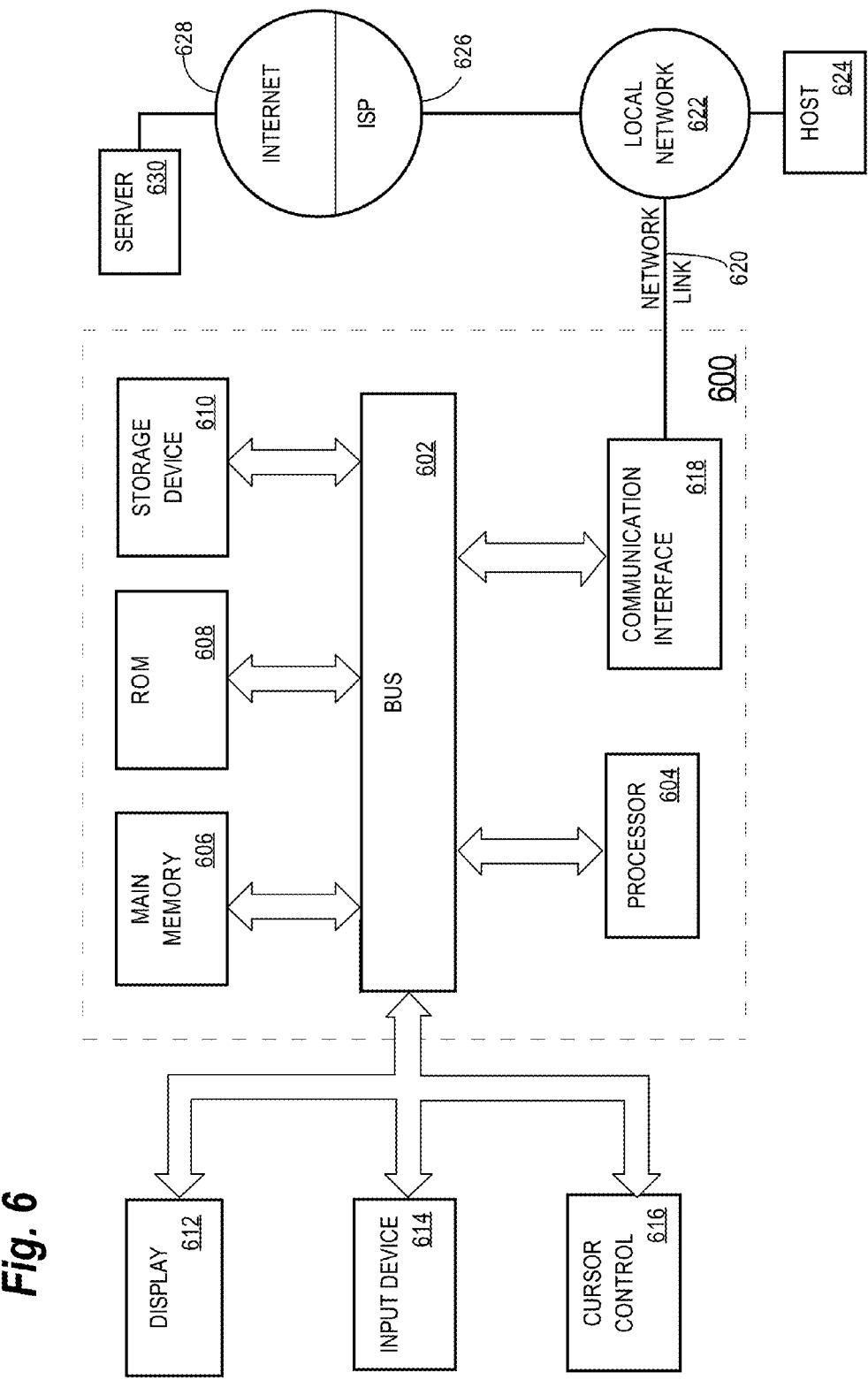
FIG. 6 is a block diagram that illustrates a computer system upon which an embodiment of the system may be implemented.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

6.0 EXTENSIONS AND ALTERNATIVES

In the foregoing specification, embodiments of the disclosure have been described with reference to numerous specific details that may vary from implementation to implementation. Thus, the sole and exclusive indicator of what is the disclosure, and is intended by the applicants to be the disclosure, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer system comprising:
   one or more network interfaces that are configured to couple to a data network and to receive a plurality of packet flows therefrom;
   one or more hardware processors coupled to the one or more network interfaces;
   an aggregator that is configured to select, based on a criterion, two or more selected packet flows from the plurality of packet flows and placing the selected packet flows into a set;
   a feature analyzer that is configured to determine a plurality of flow features and a plurality of flow classes for the set at least by, for each packet flow in the set:
      determining a corresponding flow feature, of the plurality of flow features, associated with that packet flow based on data from that packet flow and any combination of one or more of: URL data from that packet flow, flow duration of that packet flow, number of bytes transferred in that packet flow, type of that packet flow, status of that packet flow, referrer of that packet flow, timestamps associated with that packet flow, internet address of a computing device originating that flow, type of the computing device originating that packet flow, or status of the computing device originating that packet flow, and
      classifying that packet flow into a flow class, of the plurality of flow classes, based on the corresponding flow feature;
   the feature analyzer that is further configured to determine a set feature for the set based on the plurality of flow features that are associated with the selected packet flows of the set;
   a classifier that is configured to classify the set into a set class based on the set feature; and a threat reporter that is configured to report, based on the set class, a threat incident on a computing device originating the selected packet flows.

2. The system of claim 1, wherein the feature analyzer is further configured to determine the set feature by calculating an aggregate function of the plurality of flow features.

3. The system of claim 1, wherein the classifier is further configured to determine the set class based on the plurality of flow classes for the set.

4. The system of claim 1, wherein the criterion is based on the selected packet flows that are associated with a particular event on the computing device originating the selected packet flows.

5. The system of claim 4, wherein the particular event is an action performed on the computing device originating the selected packet flows.

6. The system of claim 1, wherein:
the aggregator is further configured to select, into a group, one or more sets of packet flows that include the set, based on temporal attributes or native features of particular packet flows of the one or more sets of packet flows that originated at the computing device;
the feature analyzer is further configured to determine a group feature for the group based on one or more set features corresponding to the one or more sets; and
the classifier is further configured to classify the group into a group class based on the group feature.

7. The system of claim 6, wherein the feature analyzer is further configured to determine the group feature by calculating an aggregate function of the one or more set features.

8. The system of claim 6, wherein the classifier is further configured to determine the group class based on any combination of one or more of:
the one or more set features,
particular one or more flow features corresponding to the particular packet flows of the one or more sets,
set classes that the one or more sets are classified into, or
particular flow classes that the particular packet flows are classified into.

9. The system of claim 6, wherein the temporal attributes are timestamps of the particular packet flows.

10. The system of claim 9, wherein the timestamps of the particular packet flows are within a particular time duration.

11. A method comprising:
receiving a plurality of packet flows from a data network;
selecting, based on a criterion, two or more selected packet flows from the plurality of packet flows and placing the selected packet flows into a set;
determining a plurality of flow features and a plurality of flow classes for the set, comprising, for each packet flow in the set:
determining a corresponding flow feature, of the plurality of flow features, associated with that packet flow based on data from that packet flow and any combination of one or more of: URL data from that packet flow, flow duration of that packet flow, number of bytes transferred in that flow, type of that packet flow, status of that packet flow, referrer of that packet flow, timestamps associated with that packet flow, internet address of a computing device originating that packet flow, type of the computing device originating that packet flow, or status of the computing device originating that packet flow, and
classifying that packet flow into a flow class, of the plurality of flow classes, based on the corresponding flow feature of the plurality of flow features;
determining a set feature for the set based on the plurality of flow features that are associated with the selected packet flows of the set;
classifying the set into a set class based on the set feature;
based on the set class, reporting a threat incident on a computing device originating the selected packet flows; and
wherein the method is executed by one or more computing devices.

12. The method of claim 11, further comprising determining the set feature by calculating an aggregate function of the plurality of flow features.

13. The method of claim 11, further comprising determining the set class based on the plurality of flow classes for the set.

14. The method of claim 11, wherein the criterion is based on the selected packet flows that are associated with a particular event on the computing device originating the selected packet flows.

15. The method of claim 14, wherein the particular event is an action performed on the computing device originating the selected packet flows.

16. The method of claim 11, further comprising:
selecting, into a group, one or more sets of packet flows that include the set, based on temporal attributes or native features of particular packet flows of the one or more sets of packet flows that originated at the computing device;
determining a group feature for the group based on one or more set features corresponding to the one or more sets; and
classifying the group into a group class based on the group feature.

17. The method of claim 16, further comprising determining the group feature by calculating an aggregate function of the one or more set features.

18. The method of claim 16, further comprising determining the group class based on any combination of one or more of:
the one or more set features,
particular one or more flow features corresponding to the particular packet flows of the one or more sets,
set classes that the one or more sets are classified into, or
particular flow classes that the particular packet flows are classified into.

19. The method of claim 16, wherein the temporal attributes are timestamps of the particular packet flows.

20. The method of claim 19, wherein the timestamps of the particular packet flows are within a particular time duration.

* * * * *